Oct. 29, 1946.　　R. A. ROMBERG　　2,410,306
WELDING SHIELD OR THE LIKE
Filed Oct. 18, 1944
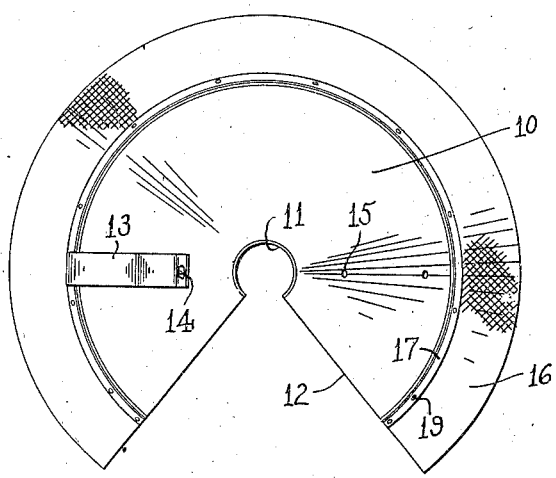
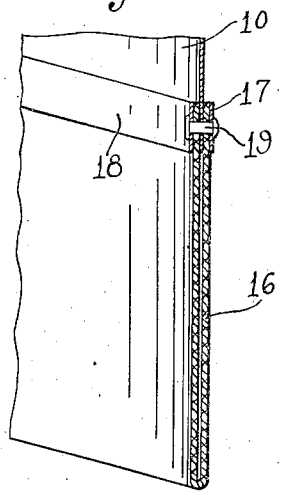
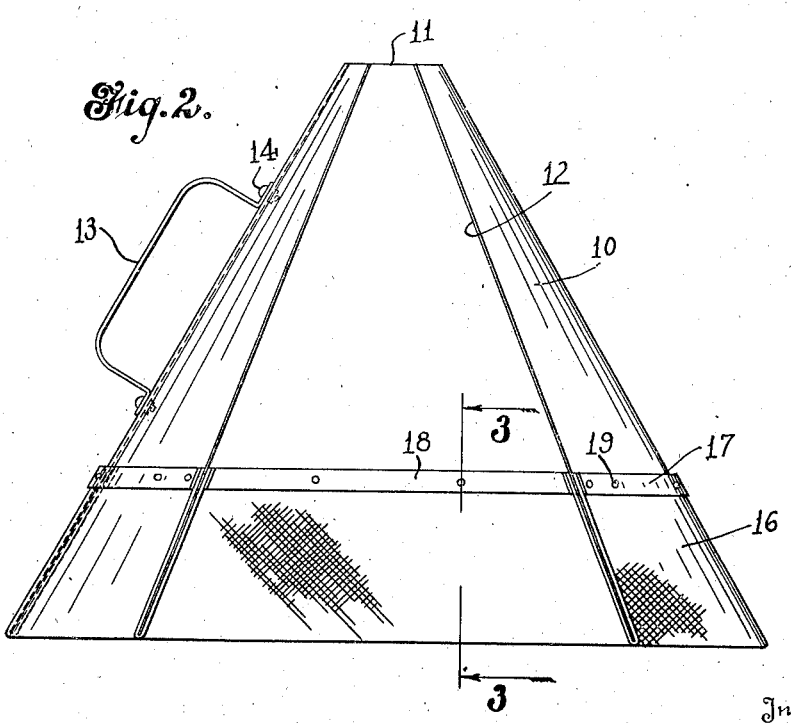
Inventor
Raymond A. Romberg
By Rockwell-Bartholow
Attorneys Patented Oct. 29, 1946

2,410,306

UNITED STATES PATENT OFFICE 2,410,306

WELDING SHIELD OR THE LIKE

Raymond A. Romberg, Orange, Conn.

Application October 18, 1944, Serial No. 559,145

1 Claim. (Cl. 189—2)

This invention relates to a welding shield and more particularly to a light portable shield which one, employed in welding operations, may readily carry from place to place and set over the work so that the glare from the arc of the welding operation will be substantially completely shielded.

In welding operations, the welder is normally provided with goggles or lenses so that his eyes are protected. However, when the work is performed in a room where others are working, it is necessary to shield the arc so that those in the room or at adjacent benches will not be subjected to its glare. It is contemplated by the present invention to provide a light portable shield which may be carried without effort and which may be placed closely over the work to protect the eyes of surrounding persons. The shield is provided with an opening at one side through which the user may observe the work and may introduce the welding tools. This opening, however, will be substantially covered by the body of the operator who will stand in front of the opening and, as previously stated, his eyes will be protected by other devices.

One object of the invention is to provide a hood or shield of light construction so arranged that it may be placed around the work to effectively shield the eyes of surrounding workmen from the glare of the arc.

A further object of the invention is to provide a light-weight shield or hood, substantially conical in form and having an opening in one side thereof, with a flexible skirt portion at the lower end so that the shield may effectively conceal the work and the welding arc to prevent injury to surrounding persons.

To these and other ends the invention relates to the novel features and combinations of parts to be hereinafter described and claimed.

In the accompanying drawing:

Fig. 1 is a top plan view of a welding shield or hood embodying my improvements;

Fig. 2 is a front elevational view of the same; and

Fig. 3 is a fragmentary sectional view on line 3—3 of Fig. 2.

To illustrate a preferred embodiment of my invention I have shown in Fig. 1 of the drawing a shield comprising a body portion 10 which may preferably be made of light sheet metal. As shown, the body of the shield is substantially conical in shape having a flaring base or bottom end and the walls tapering inwardly and upwardly to provide a relatively small upper end. The material of the shield may be varied but it should be opaque and non-inflammable and may conveniently be made of sheet metal of relatively thin gauge so that it will be of light weight.

The body portion of the shield is hollow and is provided at the top with a small opening 11 which, as shown, is substantially circular in shape. The body of the shield is not entirely closed but is provided with a relatively narrow opening 12 at the front through which the user may work and through which he may view the work being done. This opening 12 also tapers so as to be larger at the bottom than at the top and will be so proportioned that when the user is standing in front of the shield, the opening will be substantially filled or closed so that nearby workmen will not be subjected to the flame or arc.

The body portion 10 may also be provided with a handle 13 by which the shield may be carried and also by which it may be held by the operator during use. This handle may be held in place by bolts 14 passing through the wall of the body portion of the shield, and the opposite side of the shield may be provided with openings 15 so that the handle may be secured upon the other side if desired, depending upon whether the user is right- or left-handed.

At the lower end of the body portion of the shield there is provided a flexible skirt 16 which is secured to the lower edge thereof and projects downwardly therefrom. This shield, while of flexible material, is also preferably of non-inflammable material such as asbestos, for example. The lower edge of the skirt may be doubled upon itself to prevent raveling or wear and, as shown, the entire skirt is of two-ply thickness. The free edges are secured one upon each side of the body portion 10 by sheet metal bands 17 and 18 held in place by rivets 19. These bands will also prevent raveling of the free edges of the flexible skirt and hold the latter securely in place.

It will be apparent that a lightweight shield of the character described may be conveniently held over the work by one hand of the operator while he is performing a welding operation with the other hand. Moreover, the flexible skirt at the lower portion of the shield enables the latter to fit closely about the work even when parts of the latter extend beyond the base of the shield so that the flame or arc will be effectively concealed and protection given to adjacent workmen.

The user, as stated, will stand in front of the opening 12, and this opening will be screened by his body. The upper opening 11 provides a ventilating opening and also enables the shield to be employed conveniently upon pipes or the like as it can be placed about the pipe with the latter extending through the opening 11.

As shown, the body 10 of the shield is made from a single piece of sheet metal cut to the required size and shape and then formed into a body of substantially frusto-conical form. It will, of course, be understood that the invention is not limited to a shield of circular cross section but may be of pyramidal form or any desired cross-sectional shape.

While I have shown and described a preferred embodiment of my invention, it will be understood that it is not to be limited to all of the details shown, but is capable of modification and variation within the spirit of the invention and within the scope of the claim.

What I claim is:

A portable welding shield comprising a hood having a rigid one-piece body portion of substantially frusto-conical form with openings at the top and bottom, said top opening being of circular shape and of relatively small diameter to closely embrace a pipe or like object, there being an opening in the wall of the body portion communicating with said top and bottom openings, the width of said opening being progressively greater from top to bottom of the shield, a flexible skirt secured to and projecting downwardly from the lower edge of the body portion, and a handle secured to the rigid body portion whereby the shield may be held by the operator during use.

RAYMOND A. ROMBERG.